EDMOND HENRY-BIABAUD
INVENTOR

By Wenderoth, Lind and Ponack.
Attorneys

United States Patent Office 3,522,941
Patented Aug. 4, 1970

3,522,941
HYDRAULIC SUSPENSION SYSTEM HAVING A PLURALITY OF ACCUMULATORS
Edmond Henry-Biabaud, Paris, France, assignor to Societe Anonyme Andre Citroen, Paris, France, a French Corporation
Filed Oct. 4, 1967, Ser. No. 672,863
Claims priority, application France, Oct. 18, 1966, 80,396
Int. Cl. B60q 11/30
U.S. Cl. 267—64  5 Claims

ABSTRACT OF THE DISCLOSURE

A fluid-containing suspension system for automotive vehicle, characterized in that it comprises at least two accumulators set under different pressures, each accumulator except the one operating under the highest pressure communicating respectively with the suspension system via a slide valve responsive to the suspension pressure and urged to its open position by a calibrated resilient member, said slide valve being moved to its closed position when the pressure of the suspension fluid becomes higher than the pressure prevailing in one of the other accumulators at a higher pressure value.

---

In a suspension system comprising pressure-fluid accumulators, notably for automitive vehicles, it may be advantageous to replace the now conventional accumulator operating under relatively low pressure by a different accumulator operating under a relatively higher pressure, in order to produce an additional damping action consistent with high-load conditions and differing of course from the damping action consistent with low-load conditions.

It is the essential object of the present invention to provide a suspension system operated by means of a fluid, which is characterised essentially in that it comprises a plurality of accumulators having different inflation pressures and communicating with the suspension system proper through the medium of slide valves responsive to the suspension pressure, one of these slide valves urged to its open position by a calibrated resilient member beginning to shut when the fluid pressure exceeds the pressure prevailing in one of the other accumulators.

Therefore, with the device of this invention it is possible to operate the suspension system with a single accumulator at a time, except during a short period of transition, as each accumulator has its inherent damping action.

From the point of view of compactness of the system, it is advantageous to use a plurality of accumulators operating under stepped pressure values, the accumulator having the lowest pressure being rendered inoperative at each change; in fact it will be noted that the volume of gas required for suspension flexibilities thus obtained under high load conditions would require, when expanded for no-load operation, a volume considerably greater than that of an accumulator dimensioned for such no-load operation, that is, under low-pressure conditions. Thus, the arrangement contemplated by the present invention permits of reducing the volume of the accumulators and also that of the fluid reservoir. It is also advantageous in that it avoids the presence of high pressures in the accumulators under low inflation pressures and thus reduces the diffusion of gas through the partition-forming membranes of diaphragms.

In order to afford a clearer understanding of this invention and of the manner in which the same may be carried out in practice, reference will now be made to the accompanying drawings illustrating diagrammatically by way of example two typical forms of embodiment thereof. In the drawings.

Figure 1:
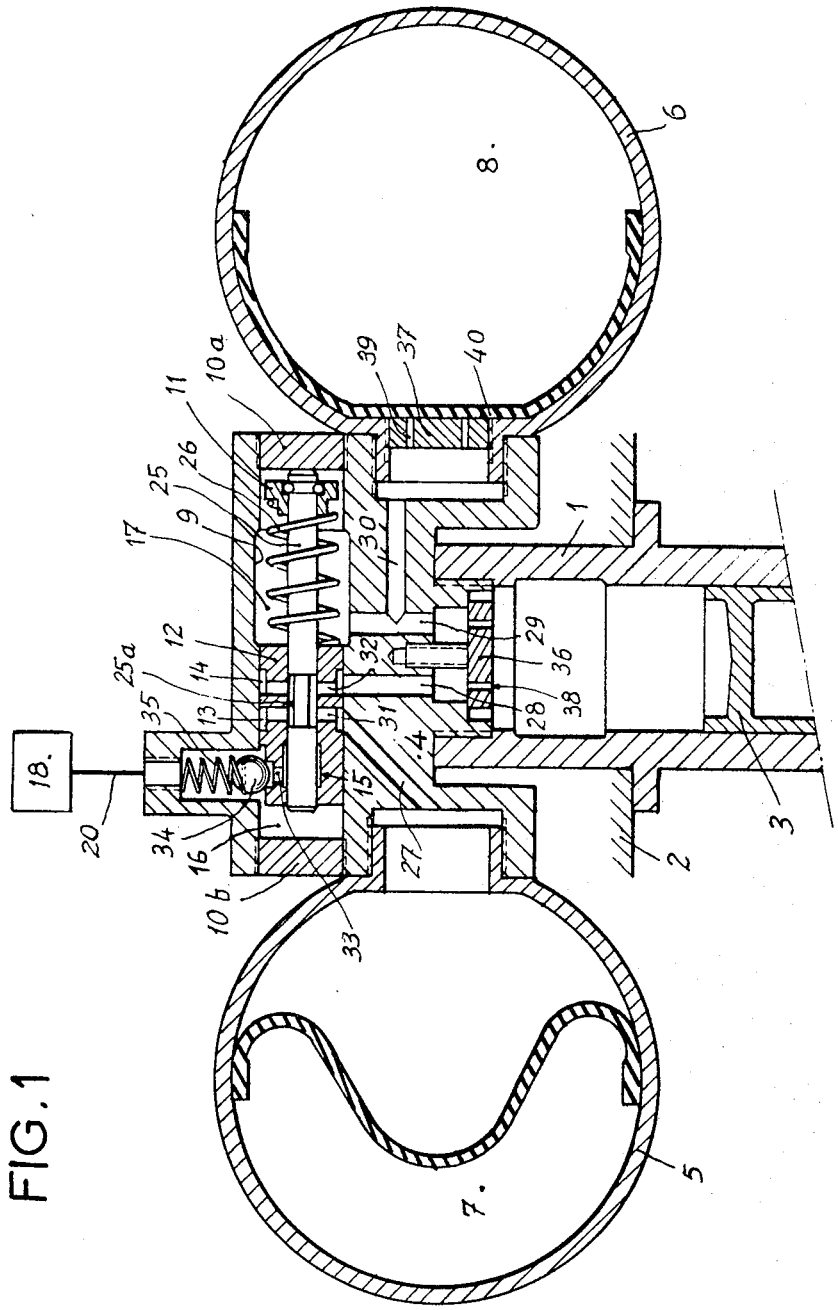
FIG. 1 is a longitudinal sectional view showing a first form of embodiment with the slide valve in its open condition.

Referring first to FIG. 1 of the drawings, it will be seen that the suspension system illustrated comprises a cylinder 1 secured to a frame or the body structure 2 of an automotive vehicle, and having slidably mounted therein a piston 3 connected to an unsprung portion of the vehicle. Secured to the upper portion of said cylinder 1 is a case 1 supporting a pair of hydraulic accumulators 5 and 6 in which different pressures $P_0$ and $p_0$ are obtained respectively, for example by means of different gaseous fillings 7 and 8, respectively.

A bore 9 formed in said case 4 and closed at its ends by plugs 10 and 11 has a cylinder body 12 slidably fitted therein; annular grooves 13, 14 are formed in the outer peripheral surface of this cylinder body 12, and an internal groove 15 is formed in the bore thereof, as shown. This cylinder body divides the bore 9 into two chambers 16 and 17, chamber 16 communicating with a fluid reservoir 18 under pressure via a pipe line 20.

Slidably fitted in turn in the cylinder body 12 is a slide valve 25 formed with a groove 25a; this slide valve 25 has an extension projecting into said chamber 17 and receiving a piston 11 sliding with a relatively great clearance in the cylindrical bore 17, a coil compression spring reacting against cylinder 12 to urge said piston 11 and therefore the valve stem solid therewith away from said cylinder body 12.

Ports 27, 28, 29, 30 and 31, 32, 33 formed in the case 4 and in the cylinder body 12 respectively cause the hydraulic accumulator 5 to communicate with groove 13, the suspension cylinder 1 with groove 14, the chamber 17 with the hydraulic accumulator 6, the grooves 13, 14 with the interior of said cylinder body 12 and finally the groove 15 with chamber 16. The port 33 is normally shut by a ball 34 urged by a calibrated spring 35, throttling members 36, 37, such as diaphragms having perforations 38, 39 formed therein, being disposed at the inlet or outlet ends of ports 28, 29 and 30.

It will be noted that when one of the ends of slide valve 25 is pressed against the plug 10a sealing the relevant end of bore 9 (FIG. 1) the groove 25a of slide valve 25 registers with the orifices of ports 31 and 32, this groove still registering with port 31 and communicating in this case with the groove 15 of the cylinder body, when the opposite end of the slide valve contacts the other plug 10b.

The operation of the above-described device will now be explained, assuming that the pressure $P_0$ is higher than pressure $p_0$, and the total cross-sectional area of the holes 38 formed through the throttling member 36 is greater than the total area of the holes 39 formed through the other throttling member 37.

Figure 3:
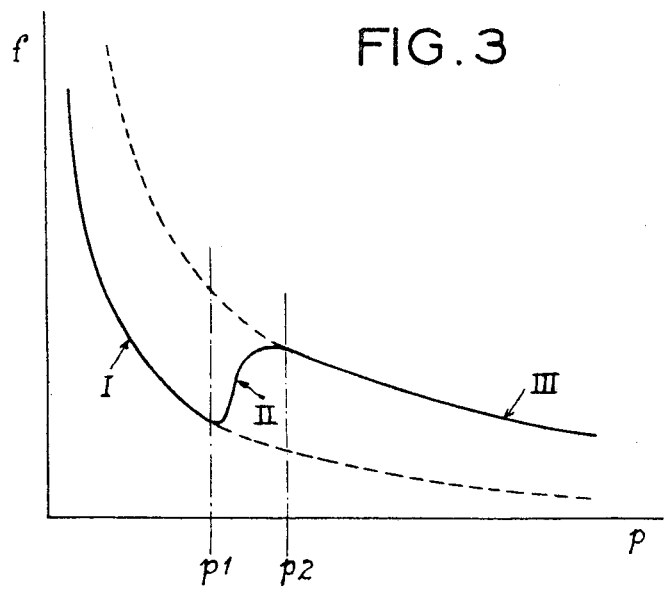
FIG. 3 shows the variation in flexibility of the suspension system of FIGS. 1 and 2 as a function of the fluid pressure.

When the vehicle is unloaded or moderately loaded the return spring 26 urges the end of slide valve 25 against the end plug 10a, thus maintaining the accumulator 5 in fluid communication with the suspension cylinder 1 via the ducts 27, 28, 31 and 32, grooves 13, 14 and 25a, and holes 38 formed in diaphragm 36. The flexibility $f$ of the suspension system which results from the low-pressure accumulator 5 varies as a function of the fluid pressure $p$ resulting from the axle load as shown in FIG. 3 (section I of the thick-line curve).

When the vehicle load is increased and the pressure of the fluid flowing to the right of piston 11 becomes higher than a predetermined value $p_1$ sufficient to move the slide valve 25 against the resistance of the return spring 26, the groove 25a does not register with duct 32, thus gradually cutting off the fluid communication between the accumulator 5 and the cylinder 1. This transient operation of the suspension system is illustrated by section II of the thick-line curve of FIG. 3.

When the vehicle load is further increased, the wall of slide valve 25 shuts completely port 32 (FIG. 2), the fluid pressure $p$ then being higher than the aforesaid value $p_2$ (section II of the thick-line curve of FIG. 3) which is higher in turn than the pressure $P_0$. To enable the accumulator 6 to be operative before the low-pressure accumulator 5 is rendered inoperative, for example in the case of an accumulator pressurized by means of a membrane 40, this membrane must already have moved away from its bearing surface consisting advantageously of diaphragm 37, as shown in the drawing, sufficiently in order to avoid detrimental shocks during suspension beats.

At this time the two throttling members 36 and 37 are interconnected in series but in practice the fluid is retarded by the member 37 alone, the total cross-sectional area of holes 39 being smaller than that of holes 38.

Moreover, the port 33 closed by the ball valve 34 is connected with the accumulator 5 via the ports 27, 31 and grooves 25a and 15, when this accumulator is isolated. Thus, any risk of increasing the pressure prevailing in this last-named accumulator owing to possible leakages in the slide valve when the change-over took place is avoided; the spring 35 urging the ball valve 34 against the orifice of port 33 may thus be calibrated at a value corresponding substantially to that of pressure $p_1$ (FIG. 3) at which the high-pressure accumulator 6 becomes operative.

Figure 4:
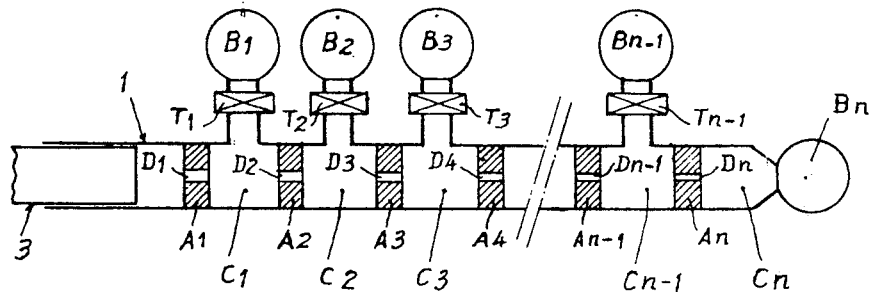
FIG. 4 shows a modified form of embodiment of this suspension.

Of course, the number of accumulators connected by turns to the vehicle suspension system may be increased, as illustrated diagrammatically in FIG. 4 of the drawings.

In this alternate form of embodiment, a suitable member of accumulators $B_1$, $B_2$ ... $B_{n-1}$ set under increasing pressures $P_1$, $P_2$, $P_3$ ... $P_{n-1}$ are secured to a vehicle suspension system, for example to the cylinder 1 in which the piston 3 is slidably mounted, said accumulators communicating with the cylinder 1 through the medium of slide valve devices $T_1$, $T_2$ ... $T_{n-1}$, comprising slide valve members (not shown) similar to the slide valve 25 of the preceding form of embodiment, said slide valve devices being urged to their open position by calibrated springs and beginning to close when the pressure of the fluid contained in said devices is lower than or equal to $p_2$, $p_3$ ... $p_n$.

Throttling members $A_1$, $A_2$, $A_3$ ... $A_{n-1}$ such as perforated diaphragms $D_1$, $D_2$ ... $D_{n-1}$, $D_n$, the cross-sectional area of the orifices therein decreasing as the reference index $n$ increases, divide the cylinder 1 into a series of compartments $C_1$, $C_2$ ... $C_{n-1}$ connected to the accumulators $B_1$, $B_2$ ... $B_{n-1}$, $B_n$, respectively.

Figure 2:
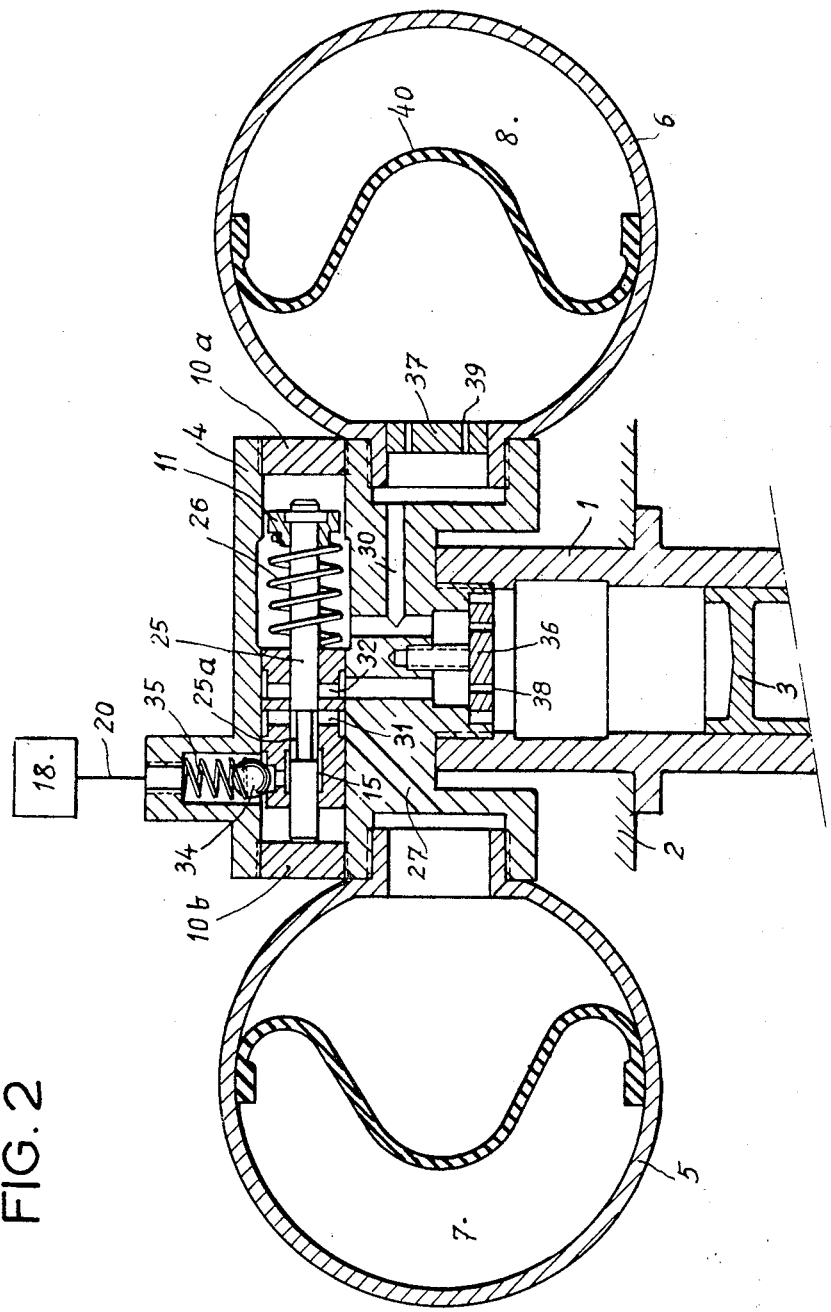
FIG. 2 is similar to FIG. 1 and shows the same device after said slide valve has been closed.

The operation of the above-described modified form of embodiment of this invention is similar to that of the device shown in FIGS. 1 and 2, the slide valves $T_1$, $T_2$ ... $T_{n-1}$ being shut and slide valve $T_{n-1}$ open when the fluid pressure $p$ is greater than $p_{n-1}$ but lower than $p_n$.

It will be noted that the values $p_2$ ... $p_n$ are preferably greater than the values $P_1$, $P_2$ ... $P_n$ so that accumulators $B_2$ ... $B_n$ become operative before the slide valves $T_1$, $T_2$ ... $T_{n-1}$ are completely closed.

Although the present invention has been described in conjunction with preferred embodiments, it is to be understood that further modifications and variations may be resorted to without departing from the spirit and scope of the invention, as those skilled in the art will readily understand. Such modifications and variations are considered to be within the purview and scope of the invention and appended claims.

I claim:
1. Suspension system for a vehicle comprising a plurality of hydropneumatic accumulators acting upon a single cylinder-piston assembly connected on one hand to a wheel and on the other hand to the chassis of a vehicle, slide valve means controlling said assembly, said accumulators having different pressures, a suspension cylinder connected to each of said accumulators through the intermediary of a valve except the accumulator with the higher pressure, said slide valve means being normally open, and means for closing successively said valve means when the pressure in said cylinder reaches a pressure above that prevailing in the accumulator with the more elevated pressure.

2. Suspension system according to claim 1 in which said slide valve means is urged to its open position by a calibrated spring.

3. Suspension system according to claim 1 in which throttling members are provided comprising relatively narrow passage orifices to divide said suspension system into compartments connected to said accumulators respectively, the pressure prevailing in any one of the intermediate accumulators being respectively higher and lower than that prevailing in the accumulators connected to the adjacent compartments, and the total cross-sectional area of the passage orifices leading to the accumulator having the highest pressure being inferior to the total cross-sectional area of the passage orifices leading to the accumulator having the lowest pressure.

4. Suspension system according to claim 3 in which one of said slide valves used for connecting an accumulator with a suspension compartment is provided with valve means adapted to discharge possible leakages from said compartment when said slide valve is closed.

5. Suspension system according to claim 3 wherein said valve means comprises a ball and a spring calibrated to open said valve means substantially when the accumulator having the highest pressure becomes operative.

References Cited

UNITED STATES PATENTS

| 3,222,047 | 12/1965 | Tuczek | 267—64 |
| 3,424,449 | 1/1969 | Strifler | 267—64 |

JAMES B. MARBERT, Primary Examiner

U.S. Cl. X.R.

188—87